US009432167B2

(12) United States Patent
Garcia

(10) Patent No.: US 9,432,167 B2
(45) Date of Patent: Aug. 30, 2016

(54) SELF-ORGANIZED DISTRIBUTED ASSIGNMENT, OPTIMIZATION, AND USE OF PHYSICAL CELL IDS

(71) Applicant: Nokia Solutions and Networks Oy, Espoo (FI)

(72) Inventor: Ian Dexter Garcia, Palatine, IL (US)

(73) Assignee: Nokia Solutions and Networks Oy, Espoo (FI)

(*) Notice: Subject to any disclaimer, the term of this patent is extended or adjusted under 35 U.S.C. 154(b) by 34 days.

(21) Appl. No.: 14/560,134

(22) Filed: Dec. 4, 2014

(65) Prior Publication Data
US 2015/0155996 A1 Jun. 4, 2015

Related U.S. Application Data

(60) Provisional application No. 61/911,732, filed on Dec. 4, 2013.

(51) Int. Cl.
H04W 24/02 (2009.01)
H04L 5/00 (2006.01)
H04W 72/08 (2009.01)
H04W 24/08 (2009.01)

(52) U.S. Cl.
CPC ............ H04L 5/0053 (2013.01); H04W 24/02 (2013.01); H04W 72/082 (2013.01); H04W 24/08 (2013.01)

(58) Field of Classification Search
None
See application file for complete search history.

(56) References Cited

U.S. PATENT DOCUMENTS

| 9,007,935 | B2* | 4/2015 | Haswarey | H04W 24/04 370/252 |
| 2010/0178912 | A1 | 7/2010 | Gunnarson et al. | |
| 2015/0195057 | A1* | 7/2015 | Tan | H04J 11/005 370/252 |
| 2015/0319624 | A1* | 11/2015 | Garcia | H04W 8/26 370/329 |

FOREIGN PATENT DOCUMENTS

| WO | WO-2013/120725 A1 | 8/2013 |
| WO | WO-2014/086394 A1 | 6/2014 |
| WO | WO-2014/086397 A1 | 6/2014 |

OTHER PUBLICATIONS

Jingjie Yu, et al.; "A Physical Cell Identity Self-Organization Algorithm in LTE-Advances Systems"; 2012 7th International ICST Conference on Communications and Networking in China; pp. 576-580.

(Continued)

Primary Examiner — Sulaiman Nooristany
(74) Attorney, Agent, or Firm — Harrington & Smith

(57) ABSTRACT

At a base station in a wireless network, interference is determined for a plurality of pairs of cells. Each pair of cells is between an individual one of one or more serving cells formed by the base station and an individual one of other cells that surround the one or more serving cells. At the base station, values for physical cell identifications are allocated for the one or more serving cells based on the interference for the plurality of pairs of cells. Systems, methods, apparatus, programs, and program products are disclosed. The examples may also take into account modulo 30, modulo 3, and modulo 6 collisions.

18 Claims, 9 Drawing Sheets

(56) References Cited

OTHER PUBLICATIONS

Premnath KN, et al.; "Self-configuration of basic LTE radio parameters using Magnetic Field Model"; 2012 IEEE; pp. 36-40.

"3$^{rd}$ Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.5.0, Sep. 2013, 347 pgs.

* cited by examiner

SELF-ORGANIZED DISTRIBUTED ASSIGNMENT, OPTIMIZATION, AND USE OF PHYSICAL CELL IDS

CROSS-REFERENCE TO RELATED APPLICATIONS

The present application claims the benefit under 35 U.S.C. §119(e) of U.S. Provisional Patent Application No. 61/911,732, filed on Dec. 4, 2013, the disclosure of which is hereby incorporated by reference in its entirety.

TECHNICAL FIELD

This invention relates generally to wireless communication and, more specifically, relates to physical layer cell identifications used in networks.

BACKGROUND

This section is intended to provide a background or context to the material disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, at the end of the text of this specification.

In an LTE RAN, the Physical Layer Cell ID (PCI) is used by a User Equipment (UE) to distinguish between different cells of the same center frequency as the UE makes cell measurements. Therefore, neighboring cells of the same center frequency should not have the same PCI values so that the UE can distinguish between all of the neighbor cells. That is, a same PCI collision, where two cells have the same PCI, is avoided. The PCIs of the nearby cells reported by the UE to the cell are used by the cell for some RRM procedures such as handovers. This requires neighbor-of-neighbor cells of the same center frequency to not have the same PCI values (i.e., the same-PCI collision or confusion must be avoided). Since the number of PCIs is limited to 0 (zero) to 503 values and same-PCI collisions and confusions must be avoided, PCI assignment is considered to be one of the most tedious phases in LTE RAN planning and optimization.

For a time-synchronized, single-frequency-layer LTE network with two or more Tx antenna ports for each cell, cells with the same PCI modulo 3 value have the same time-frequency locations of the Cell-specific Reference Signals (CRS). Since the CRS have the same time-frequency location, the CRSs of the adjacent cell interfere to the UE of the serving cell. Laboratory and field tests have shown that CRS-to-CRS interference results in 10 percent or greater drop in downlink throughput at the cell-edge compared to CRS-to-PDSCH interference, even with Block Error Rate (BLER)-based Channel Quality Indicator (CQI) correction. The CRS-to-CRS interference also potentially leads to poorer call success rates, handover success rates, and other KPIs.

The same PCI modulo 3 value also produces the same Physical Synchronization Signal (PSS) Sequence. Interference among the PSS leads to poorer detection of the presence of neighbor cells. To avoid interference between the CRSs and misdetection of the PSS, it is desirable for neighboring cells of the same center frequency to have different PCI modulo 3.

When there is a single Tx antenna port for each cell or there are two-antenna ports are in a Vertical-Horizontal (V-H) polarization configuration, the CRSs of cells with the same PCI modulo 6 values have the same time-frequency-polarization locations. To avoid interference of these CRSs which lead to degradation in performance, for this scenario, it is desirable for neighboring cells of the same center frequency to have different PCI modulo 6.

For cells with the same PCI modulo 30, these cells have the same PUCCH Demodulation Reference Signal (DMRS) sequence group number. Cells with the same DMRS group number cause more uplink interference with each other. Hence, to avoid excessive uplink interference, it is desirable for neighboring cells of the same center frequency to have different PCI modulo 30.

Because of the potential losses of having un-optimized PCI allocations in the network, it would be beneficial to improve the PCI allocations.

SUMMARY

This section is meant to contain examples and is not meant to be limiting.

An exemplary method includes: determining, at a base station in a wireless network, interference for a plurality of pairs of cells, wherein each pair of cells is between an individual one of one or more serving cells formed by the base station and an individual one of other cells that surround the one or more serving cells; and allocating, at the base station, values for physical cell identifications for the one or more serving cells based on the interference for the plurality of pairs of cells.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: determining, at a base station in a wireless network, interference for a plurality of pairs of cells, wherein each pair of cells is between an individual one of one or more serving cells formed by the base station and an individual one of other cells that surround the one or more serving cells; and allocating, at the base station, values for physical cell identifications for the one or more serving cells based on the interference for the plurality of pairs of cells.

Another exemplary embodiment is an apparatus. The apparatus comprises: means for determining, at a base station in a wireless network, interference for a plurality of pairs of cells, wherein each pair of cells is between an individual one of one or more serving cells formed by the base station and an individual one of other cells that surround the one or more serving cells; and means for allocating, at the base station, values for physical cell identifications for the one or more serving cells based on the interference for the plurality of pairs of cells.

An exemplary computer program product includes a computer-readable storage medium bearing computer program code embodied therein for use with a computer. The computer program code includes: code for determining, at a base station in a wireless network, interference for a plurality of pairs of cells, wherein each pair of cells is between an individual one of one or more serving cells formed by the base station and an individual one of other cells that surround the one or more serving cells; and code for allocating, at the base station, values for physical cell identifications for the one or more serving cells based on the interference for the plurality of pairs of cells.

DETAILED DESCRIPTION OF THE DRAWINGS

As described above, there are potential losses associated with having un-optimized PCI allocations in the network. Additional description of problems is presented after a system into which the exemplary embodiments may be used is described.

Figure 1:
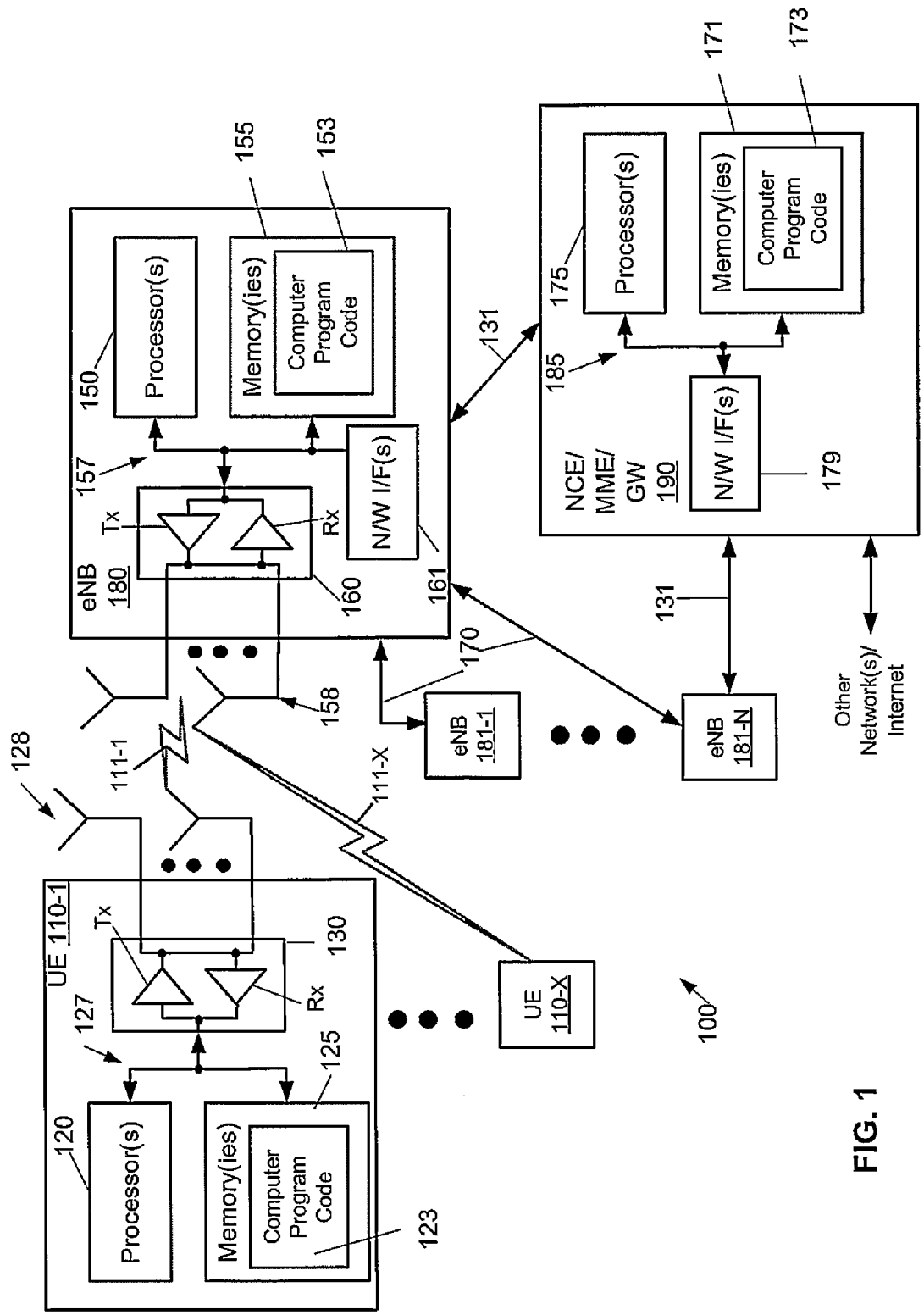
FIG. 1 is a block diagram of an exemplary system in which the exemplary embodiments may be practiced.

Turning to FIG. 1, this figure shows a block diagram of an exemplary system in which the exemplary embodiments may be practiced. In FIG. 1, there are X UEs 110-1 through 110-X that are in wireless communication with a network 100. For ease of reference, the UEs 110 are assumed to be in wireless communication with only the eNB 180, although UEs 110 may also be in communication with any of the N neighbor eNBs 181. For simplicity, it is assumed the UEs 110 are similar and therefore an example of a possible internal configuration of only the UE 110-1 is described. The user equipment 110-1 includes one or more processors 120, one or more memories 125, and one or more transceivers 130 (each comprising one or more transmitters, Tx, and one or more receivers, Rx) interconnected through one or more buses 127. The one or more transceivers 130 are connected to one or more antennas 128. The one or more buses 127 may be any suitable connection between elements, such as traces on a board, conductive elements on a semiconductor, optical elements, and the like. The one or more memories 125 include computer program code 123. In an exemplary embodiment, the one or more memories 125 and the computer program code 123 are configured to, with the one or more processors 120, cause the user equipment 110 to perform operations. The UEs 110 communicate with eNB 180 via corresponding links 111-1 through 111-X.

There is a single eNB 180 and multiple (N) neighbor eNBs 181 shown. It is assumed that the eNBs 180 and 181 are similar and therefore only an exemplary internal implementation of eNB 180 is shown. The eNB 180 includes one or more processors 150, one or more memories 155, one or more network interfaces (N/W I/F(s)) 161, and one or more transceivers 160 (each comprising one or more transmitters, Tx, and one or more receivers, Rx) interconnected through one or more buses 157. The one or more buses 157 may be any suitable connection between elements, such as traces on a board, conductive elements on a semiconductor, optical elements, and the like. The one or more transceivers 160 are connected to one or more antennas 158. The one or more memories 155 include computer program code 153. In an exemplary embodiment, the one or more memories 155 and the computer program code 153 are configured to, with the one or more processors 150, cause the eNB 180 to perform one or more of the operations as described herein. The one or more network interfaces 161 communicate over a network such as the networks 170 and 131. Two or more eNBs 180 communicate using, e.g., network 170. The network 170 may be wired or wireless or both and may implement, e.g., an X2 interface.

The wireless network 100 may include a network control element (NCE) 190 that may include MME/SGW functionality, and which provides connectivity with a further network, such as a telephone network and/or a data communications network (e.g., the Internet). The eNBs 180 and 181 are coupled via a network 131 to the NCE 190 (e.g., or other NCEs 190 not shown). The network 131 may be implemented as, e.g., an S1 interface. The NCE 190 includes one or more processors 175, one or more memories 171, and one or more network interfaces (N/W I/F(s)) 179, interconnected through one or more buses 185. The one or more memories 171 include computer program code 173. The one or more memories 171 and the computer program code 173 are configured to, with the one or more processors 175, cause the NCE 190 to perform one or more operations.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 150, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Concerning additional description of problems associated with PCIs, these problems include the following: poor network performance due to same-PCI collision, same-PCI confusion, CRS-to-CRS interference, and same-PSS interference. Additionally, DMRS-to-DMRS interference is prevalent in many LTE networks.

In an example, PCT/EP2012/074352 (publication WO2014/086397, entitled "Allocation of Physical Cell Identification," filed Dec. 4, 2012 by Ian Garcia, may be considered to describe a framework for assigning PCIs to reduce CRS/PSS/PUCCH DMRS collisions. The framework may include a centralized unit that collects signal level (e.g., RSRP) measurement or prediction data from a group of cells, and then assigns or re-assigns all the PCIs of the group of cells based from collected data.

Meanwhile, PCT/EP2012/074346 (publication WO2014086394), entitled "Algorithm for Physical Cell Identifier Allocation", filed Dec. 4, 2012, by Ian Garcia, may be considered to describe a problem formulation for the optimization of PCIs. By following this problem formulation, optimized PCIs can be found efficiently. PCT/EP2012/074346 may be considered to build on the optimization framework proposed in PCT/EP2012/074352 by defining an optimization problem with a reduced search space so that the search is efficiently performed.

There are several possible disadvantages of the methods in PCT/EP2012/074352 and PCT/EP2012/074346. First, the methods may require a centralized unit to collect the data and re-assign the PCIs, which adds to the cost and complexity of the network. Second, the methods may simultaneously jointly-optimize the PCIs across all the cells. The large solution search space involved requires a powerful search algorithm (e.g., Simulated Annealing; Genetic Algorithm) to obtain a good result, even for a small commercial network. Third, since the PCI values can only take values 0 (zero) to 503, same-PCI collisions and confusion must be avoided, and data from all the cells are required, centralized PCI re-assignment can only be performed periodically. These methods may discourage agile optimization of a rapidly changing network, where, for example, new cells are added, deleted, or re-positioned each day. Fourth, since commissioning an LTE eNB requires that there are no neighbors and neighbor-of-neighbors with same-PCIs, and changing PCIs requires that a cell is blocked-off, these methods may require that all the optimized cells be blocked-off and re-commissioned simultaneously, resulting in temporary total outage across the whole coverage area during the PCI re-assignment.

By contrast, the exemplary embodiments herein modify the PCIs of the cells of a network to avoid these conditions in order to improve the network performance such as throughput and call success rate. The exemplary embodiments improve on earlier methods at least by, e.g., allowing for the optimization of all the PCIs in a network in a distributed manner, eliminating any need for a centralized unit, and allowing for greater flexibility and autonomy of the optimization operation.

Figure 2:
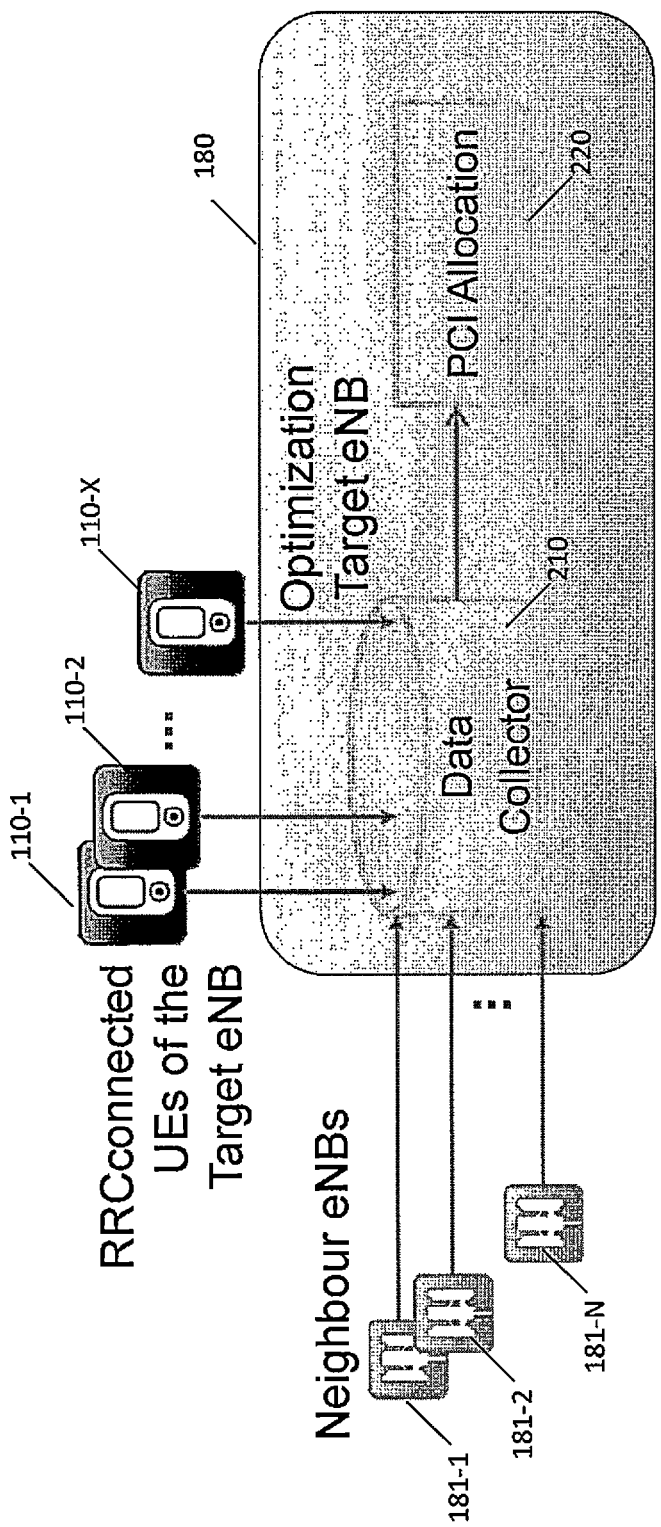
FIG. 2 is a block diagram of an exemplary configuration of a target eNB connected to UEs and neighbor eNBs for self-organized distributed optimization of physical cell IDs.

Exemplary embodiments disclosed herein include a method of optimizing the PCIs of a group of cells in a self-organized distributed manner, as opposed to the centralized approaches as mentioned above. Referring to FIG. 2, this figure is a block diagram of an exemplary configuration of a target eNB connected to UEs and neighbor eNBs for self-organized distributed optimization of physical cell IDs. The data collector process 210 and the PCI allocation process 220 are part of the eNB 180, and may be implemented, e.g., as computer program code 153 in the eNB 180. The processes 210 and 220 may also be implemented as logic in circuitry, such as an integrated circuit or programmable device such as a programmable logic device, e.g., implemented as part of the one or more processors 150 or separate circuitry. The processes 210 and 220 may be implemented as some combination of code and circuitry. The data collector process 210 collects data about the RRC connected UEs 110 of the target eNB 180 and also neighbor eNBs 181 of the target eNB 180.

In an exemplary embodiment, each eNB 180 optimizes its own cells based on X2 neighbor lists and signal-strength-based metrics the eNB 180 gathers from its cells and its neighbor cells 181. The optimization procedure for each eNB 180 may be configured to start at a specified time or a random time within a specified interval, and can be repeated automatically after some configurable period. When an eNB 180 is scheduled for optimization, the eNB first waits in an exemplary embodiment for other cells to finish their optimization step before the eNB 180 begins its own optimization. The eNB optimizes its own PCIs based from the interference the eNB 180 can receive and incur on cells from other nearby eNBs. That is, the target eNB 180 causes interference to neighbor cells 181, and the target eNB 180 measures interference from neighbor cells 181 (as the neighbor cells 181 also measure interference from the target cell 180). The interference is a metric that may be collected by the data collector process 210. The eNB 180 may use X2 neighbor lists to ensure that same-PCI confusion and collisions are avoided. The eNB 180 also may use the signal-strength-based measurements (as collected by the data collector process 210) to minimize the CRS/DMRS/PSS collisions, and to eliminate same-PCI conditions of nearby cells which are not in the neighbor list. With an exemplary proposed method, the local optimization (e.g., performed by the PCI allocation process 220) of each eNB would generally result in a total area that is more optimized, which means that the exemplary proposed optimization method is self-organized. Since this technique allows each eNB to optimize its own PCI "on-the-fly," LTE can be more easily deployable and "self-optimizable."

Figure 3B:
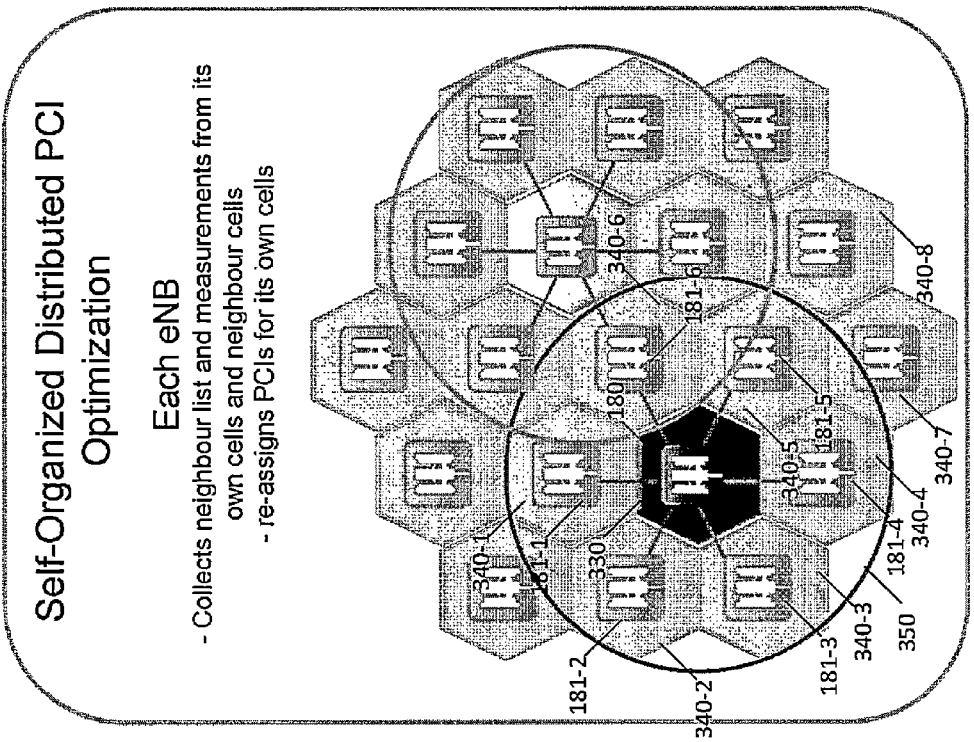
FIG. 3B is an example of a network using self-organized distributed PCI optimization.
Figure 3A:
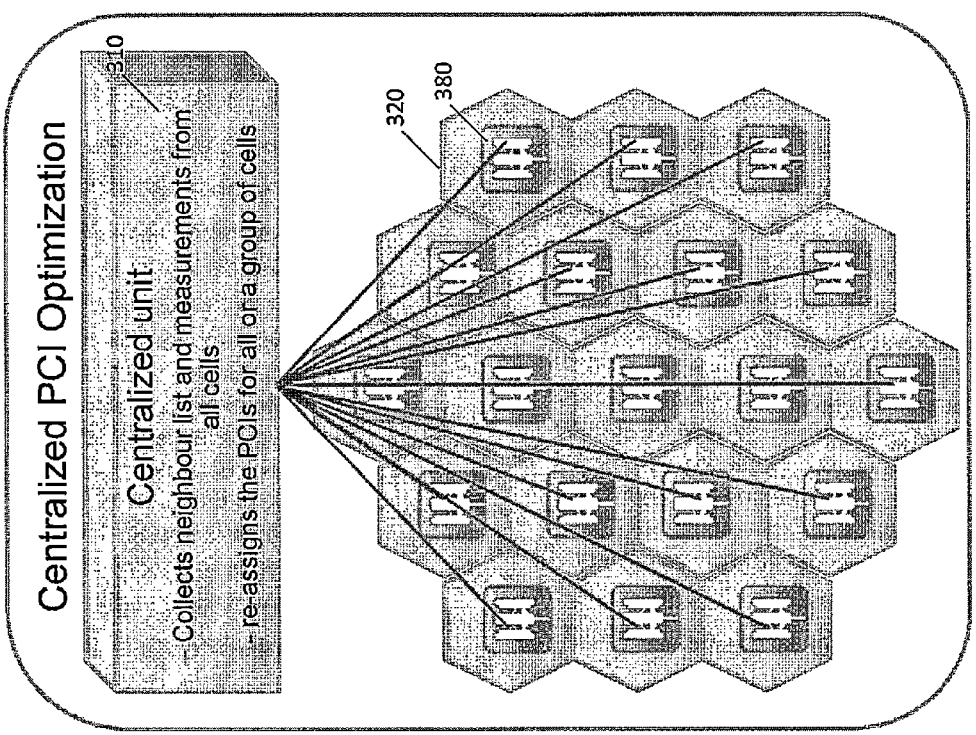
FIG. 3A is an example of a network using centralized PCI optimization.

Referring to FIGS. 3A and 3B, FIG. 3A is an example of a network using centralized PCI optimization, whereas FIG. 3B is an example of a network using self-organized distributed PCI optimization. In FIG. 3A, the centralized unit 310 collects neighbor lists and measurements from all cells 320 (each of which has an eNB 380). The centralized unit 310 re-assigns the PCI for all or a group of cells 320. In FIG. 3B, by contrast, each eNB 180 collects a neighbor list and measurements from its own cells 330 and neighbor cells 340 (each of which has an eNB 181 and is within some range 350 from the eNB 180). In this example, the target eNB 180 has six neighbor cells 181-1 through 181-6 and their corresponding cells 340-1 through 340-6. The eNB 180 re-assigns PCI for its own cells. Note that FIG. 3B also illustrates that the some of the neighbor cells 181-1 through 181-6 also have neighbor cells, of which cells 340-7 and 340-8 are marked.

The cells 340-7 and 340-8 are neighbor cells to cells 340-4 and 340-5, and also neighbor-of-neighbor cells relative to the cell(s) 330.

With regard to cells for an eNB 180, a "single" cell 330 is typically shown as a circle, an oval or (as in FIGS. 3A and 3B) a hexagon. While these are typical representation of a "cell", there can be multiple cells per eNB. For instance, there could be three cells for a single eNB carrier frequency and associated bandwidth, each cell covering one-third of a 360 degree area so that the single eNB's coverage area covers an approximate circle, oval, or hexagon. Furthermore, each cell can correspond to a single carrier and an eNB may use multiple carriers. So if there are three 120 degree cells per carrier and two carriers, then the eNB has a total of six cells 330. For simplicity, these cells as shown as a single cell 330 herein, but it should be noted that an eNB may have multiple cells.

In the centralized architecture shown in FIG. 3A, the centralized unit 310 implementable through a centralized software. By contrast, in the new approach herein, each eNB collects, e.g., Interference-to-signal-ratio metrics of its neighbors 181 and only adjusts the PCIs of its own cells. As the eNBs adjust their own PCIs, this would also generally make the whole network more optimized, so this approach is self-organized. Since this approach is also distributed, the approach can be implemented as an eNB feature without need of centralized software, and is well suited to small cells where centralized configuration of 10 times more cells compared to macro cells is infeasible to perform centrally.

Another difference between FIGS. 3A and 3B is that the new approach in FIG. 3B also may consider PCI mod 6 optimization, and this provides slightly greater gains than PCI mod 3 optimization in single-layer transmission mode, which is often the case in many indoor deployments. In addition, the new approach in FIG. 3B may include an X2+ based protocol for the distributed approach, which is not applicable in FIG. 3A. The distributed optimization concept and protocol can be applied to other important and hard-to-optimize parameters such as RACH root sequences. More detail of this new distributed approach in FIG. 3B as compared to the earlier centralized one in FIG. 3A is described below.

An exemplary embodiment is an LTE Physical Cell ID optimization method outlined in the steps discussed below. The details by which each step is achieved may vary, but exemplary embodiments are the outlined succession of steps and sub-steps, as shown in FIGS. 4 and 5 and described in the accompanying discussion.

All eNBs to be optimized simultaneously may go through a pre-allocation phase, where measurement reports from the UE in the cells of the eNBs are collected and Interference-to-Signal-Ratios are periodically calculated. The PCI allocation phase of each eNB is configured to start at a specified time or a random time within a specified interval, and can be repeated automatically after some configurable period.

Figure 4:
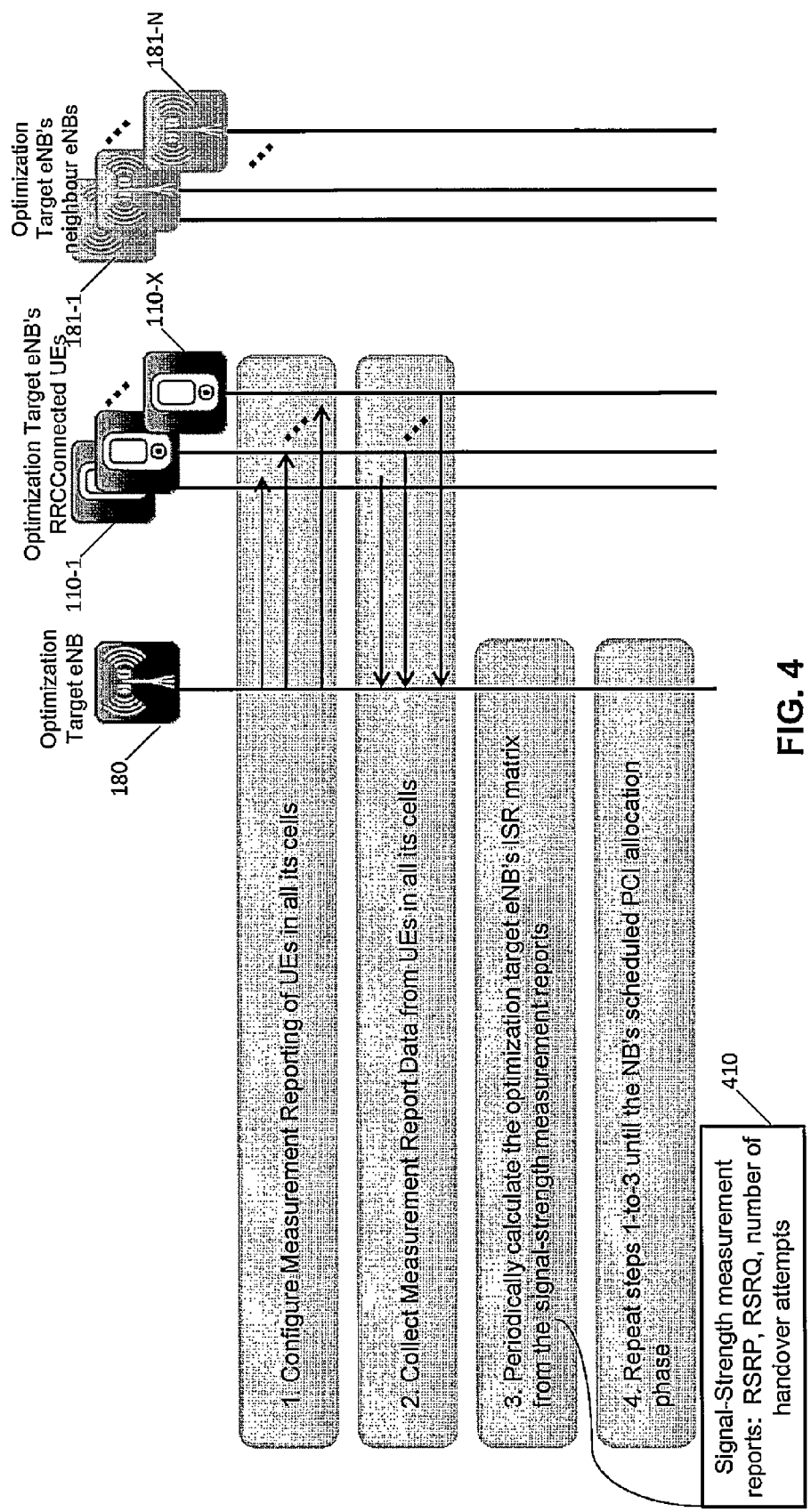
FIG. 4 is a signaling diagram of a PCI optimization method diagram for an example of a pre-allocation phase.

FIG. 4 is a signaling diagram of a PCI optimization method diagram for an example of a pre-allocation phase. In step 1, the optimization target eNB 180 configures (e.g., under control of the data collector process 210) measurement reporting of UEs 110 in all its cells 330. Measurement reports (MRs) contain cell measurement information by the UE, as defined by, e.g., 3GPP TS 36.331. See, e.g., section 5.5.5, "Measurement reporting". For measurement reports to occur, measurement reporting should first be configured by the serving cell to its UEs in RRCConnected mode. Once a UE 110 has been properly configured, this step does not have to be repeated to the UE, unless the UE loses its measurement configuration, either by reconnection, by handover, or for some other reason.

In step 2, the eNB 180 (e.g., under control of the data collector process 210) collects measurement data from UEs in all its cells 330. The measurement data can be one or more of Reference Signal Received Power (RSRP), Reference Signal Received Quality (RSRQ), a number of handover attempts, etc. Henceforth, we shall refer to these measurements as "signal strength" measurements. At each period, for instance, the Reference Signal Received Power (RSRP) data of all the eNB's cells 330 of a particular center frequency and their neighbor cells 340 of the same center frequency are collected from measurement reports that are received. If the optimization target eNB's cells 330 are of different frequencies, their PCI optimizations are performed separately and independently.

Cells are identified according to, e.g., their Cell Global ID (CGI). The measurements may be mapped to each cell 330, e.g., using the PCI and center frequency combination or the CGI.

The signal strength measurements are mapped to each serving-cell-other-cell pair. A measurement report that contains N neighbor signal strength measurements is mapped to the N serving-cell-other-cell combinations. Since the measurement reports are only gathered from the optimization target eNB 180, only the cells 330 of the optimization target eNB are considered as serving cells. A signal strength measurement that does not meet some pre-defined threshold may be ignored.

The duration of the period may be pre-determined such that a sufficient number of measurement reports are gathered during the period. At period t, the i'th serving cell and its j'th other cell has $K_{i,j}(t)$ signal strength measurements, where the k'th server signal strength measurement of the pair is denoted by $R_{i,j,k}^{server,dBm}(t)$ and the k'th other cell signal strength measurement of the pair is denoted by $R_{i,j,k}^{other,dBm}(t)$. These signal strength measurements are in dBm (decibel milliwatts).

In step 3, the eNB 180 (e.g., again under control of the data collector process 210) periodically calculates the optimization target eNB's Interference-to-Signal Ratio (ISR) matrix from the signal strength measurement reports. The signal strength measurement reports 410 may comprise one or more of RSRP, RSRQ, and/or a number of handover attempts. The Interference-to-Signal Ratio (ISR) matrix of the target eNB $\Gamma^{target}$ is used to estimate the potential degradation of the signal quality due to interference, for each cell combination. The rows of the target eNB's ISR matrix correspond to its $N_{cells}^{target}$ cells, while the columns correspond to its $N_{cells}^{target}$ cells and the $N_{cells}^{surrounding}$ cells, which are composed of the X2 neighbor cells, X2 neighbor-of-neighbor cells, and other cells which have signal strength measurements but are not yet designated as X2-neighbour cells or are not yet designated as X2 neighbor-of-neighbors cells. Neighbor (also spelled "neighbour") cells are the cells to which the UE can handover. These cells are from the same eNB or from an eNB with an X2 interface to the eNB of the target cell. Surrounding cells are all the cells not within the same eNB and whose signals have the potential to interfere with the signal reception of target cells and their UEs. The cells of the target eNB and the surrounding cells together form the neighborhood of cells for that target eNB.

The element at row i column j of $\Gamma^{target}$ corresponds to the ij'th serving-cell-other-cell pair. The rows and columns have the same ordering, i.e., the other cell refers to the server cell when i=j.

To reduce its the short-term random variations, $\Gamma^{target}$ can be time-period-filtered. For example, if a first-order IIR filter is used, at the t'th period, $$\Gamma_{i,j}^{target}(t) = \left(1 - \frac{1}{\tau}\right)\Gamma_{i,j}^{target}(t-1) + \frac{1}{\tau}\Gamma_{i,j}^{new}(t), \quad (1)$$

where $\tau$ is a constant forgetting factor. Obviously, without a filter, $\Gamma_{i,j}^{target}(t) = \Gamma_{i,j}^{new}(t)$.

The contribution of the signal strength measurements of the latest period is given by $$\Gamma_{i,j}^{new}(t) = \begin{cases} \left(\sum_{k=1}^{K_{i,j}(t)} \frac{R_{i,j,k}^{other}(t)}{R_{i,j,k}^{server}(t)}\right) & i \neq j; R_{i,j,k}^{server}(t) > 0 \\ 0 & i \neq j; R_{i,j,k}^{server}(t) = 0 \\ 0 & i = j \end{cases}, \quad (2)$$

where the rows and columns order of $\Gamma_{i,j}^{new}$ correspond to the row and column order of $\Gamma_{i,j}^{target}$. The columns of $\Gamma^{target}(t)$ and $\Gamma^{new}(t)$ are arranged such that their first columns correspond to the interference from the optimization target eNB's cells $N_{cells}^{target}$. Prior to the calculation, the signal strength measurements are converted from dBm to mW (milliwatt) units.

As seen from Eq. 2, the numerator consists of the signal strength of another cell, which behaves as interference to that of the server cell, hence $\Gamma_{i,j}^{new}$ is seen as an "ISR" quantity. The higher this value is, the greater the degradation to the signal from the potential collisions of the interferer.

In step 4, the eNB 180 (e.g., under control of the data collector process 210) repeats steps 1-to-3 until the eNB's scheduled PCI allocation phase.

Figure 5A:
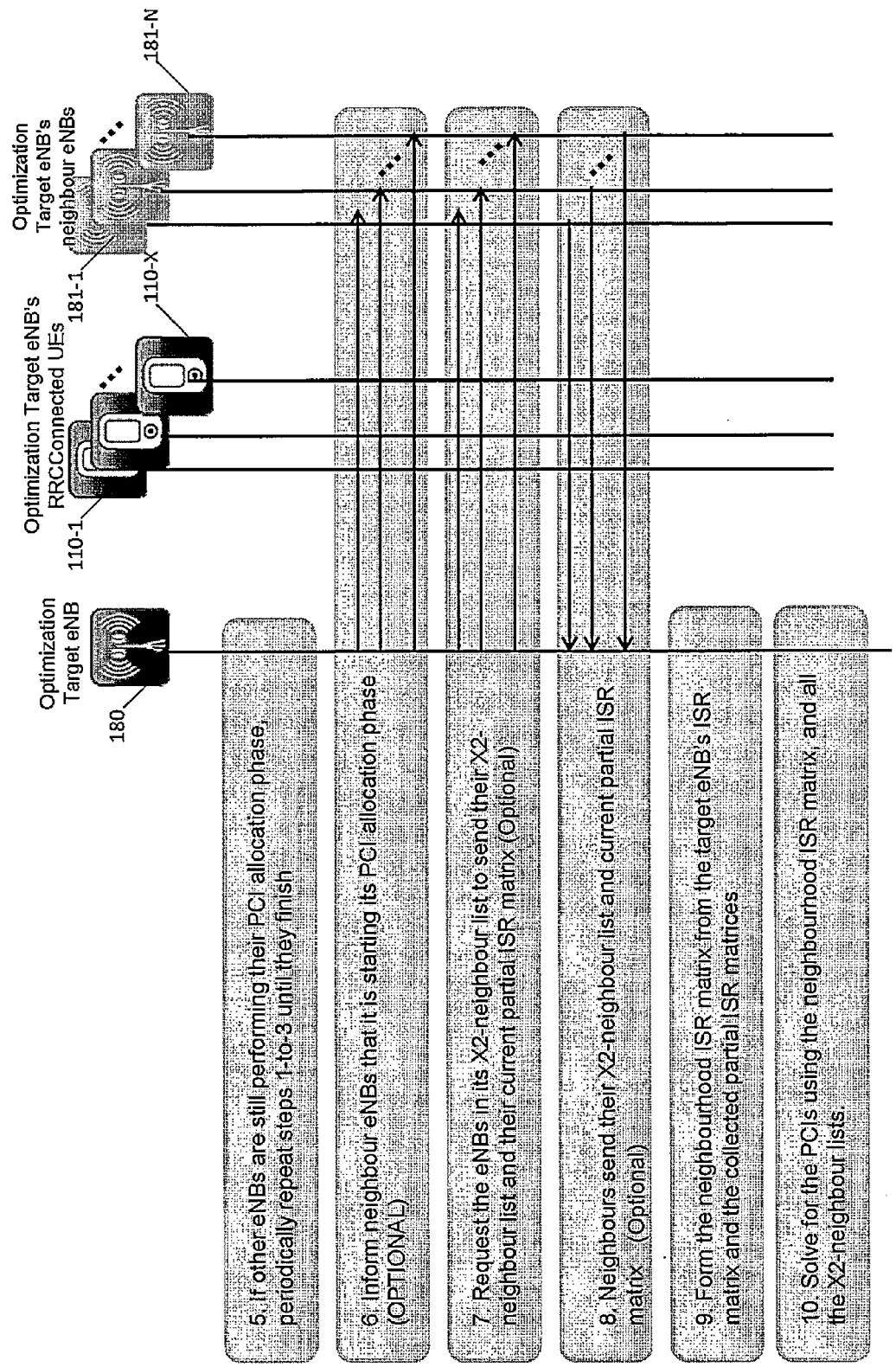
FIGS. 5A and 5B, collectively referred to as FIG. 5 herein, are signaling diagrams of a PCI-allocation procedure.
Figure 5B:
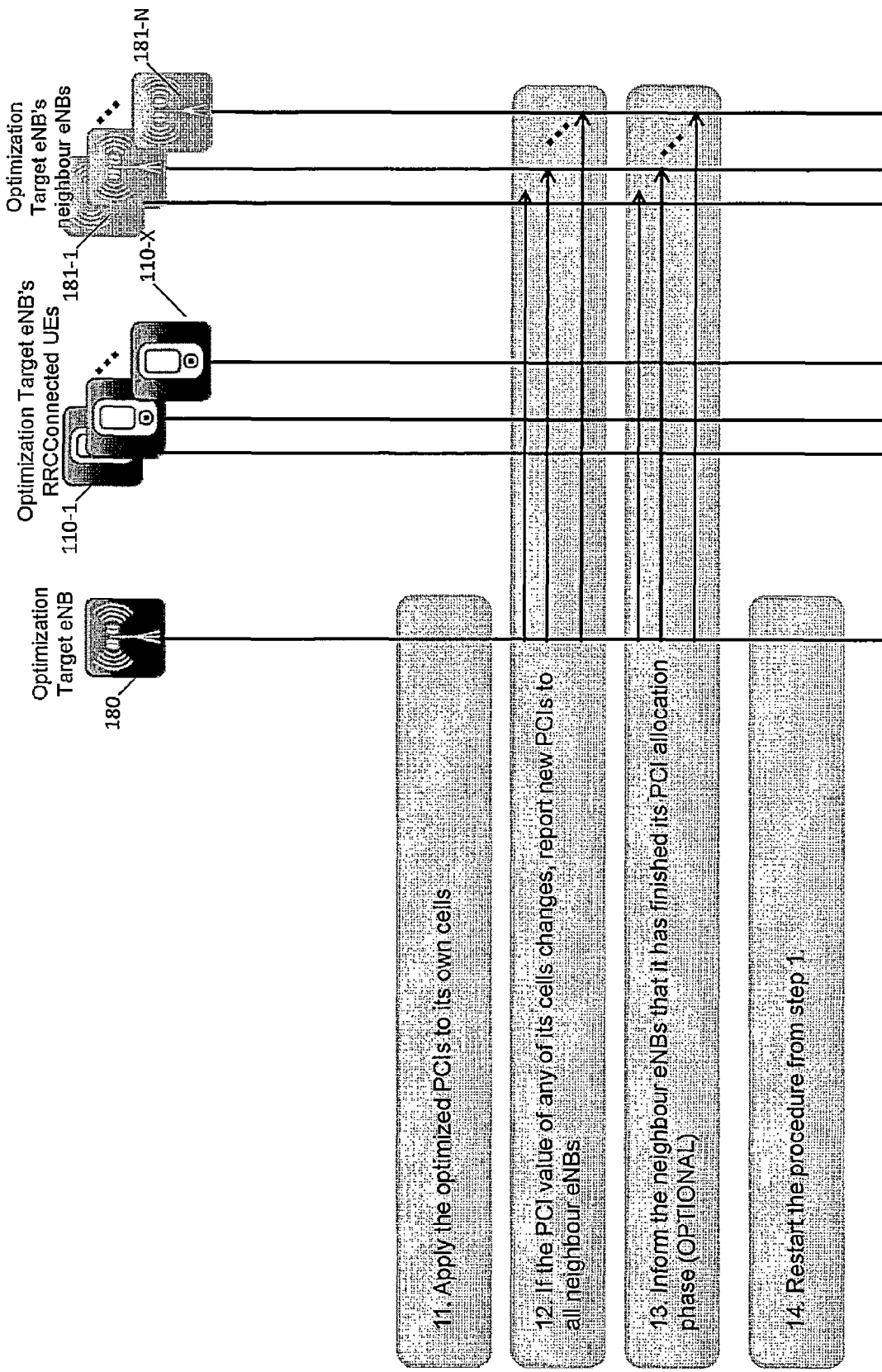

With regard to a second phase, a PCI allocation phase, proceeding to the PCI allocation phase may be automated, or may require a user prompt to proceed. FIGS. 5A and 5B, referred to collectively as FIG. 5 herein, are signaling diagrams of a PCI-allocation procedure. It is assumed that the eNB 180 performs steps 5-7 and 9-14, e.g., under control of the PCI allocation process 220.

In step 5, the eNB 180 determines if other eNBs are still performing their PCI allocation phase, and periodically repeats steps 1-to-3 until the other eNBs finish. This step is performed to ensure that the target eNB 180 will have the current and correct X2-neighbour measurements and PCI information while the eNB 180 performs its PCI allocation.

In step 6, the eNB 180 informs neighbor eNBs 181 that the eNB 180 is starting its PCI allocation phase. This is optional. This message will signal the neighbor eNBs 181 to avoid performing their own PCI allocation phase while the optimization target eNB's PCI allocation phase is proceeding.

In step 7, the eNB 180 requests the eNBs 181 in its X2-neighbour list send their X2-neighbour list and their current partial ISR matrix. The X2-neighbour list contains the CGI and PCI of all neighbor cells, as contained in the eNB neighbor relation database. The partial ISR matrix $\Gamma^{partial,n}(t)$ of the n'th neighbor eNB 181 is the columns of the neighbor eNB's own target ISR matrix which correspond to the optimization target eNB's cells. Their columns have been re-ordered to correspond to the ordering of $\Gamma^{target}(t)$. Request of the partial ISR matrix is optional.

In step 8, the neighbor cells 181 send their X2-neighbour list and current partial ISR matrix to the target eNB 180 (that is, the target eNB 180 receives these in step 8). Sending of the partial ISR matrix is optional.

In step 9, the eNB 180 forms the neighbourhood ISR matrix from the target eNB's ISR matrix and the collected partial ISR matrices. The eNB 180 also collects the ISR matrices to form the neighbourhood ISR matrix $\Gamma^{neighbourhood}(t)$, where $$\Gamma^{neighbourhood}(t) = \begin{bmatrix} \Gamma^{target}(t) & & 0 \\ \Gamma^{partial,1}(t) & 0 & 0 \\ \Gamma^{partial,2}(t) & 0 & 0 \\ \vdots & \vdots & \vdots \\ \Gamma^{partial,N}(t) & 0 & 0 \\ 0 & & 0 & 0 \end{bmatrix}, \quad (3)$$

where zero values are appended on the row of $\Gamma^{target}(t)$ to make the number of rows and columns of $\Gamma^{neighbourhood}(t)$ equal. That is, zero values are appended to the rows of the $\Gamma^{partial,n}(t)$, to complete the matrix, and zero values, corresponding to the X2 neighbor-of-neighbor cells are appended to each column. In an exemplary embodiment, set $\Gamma^{partial,n}(t)0=0$ if the partial ISR matrix is not received from the neighbor cell n This neighbourhood ISR matrix is used to solve for the optimized PCI mod 3, PCI mod 6, and PCI mod 30 values of the cells. Each element of the neighbourhood ISR matrix corresponds to a signal and interferer cell pair, where the i'th row and j'th column of $\Gamma^{neighbourhood}(t)$ corresponds to the i'th signal and j'th interferer.

The optimum PCI allocation minimizes the sum of the ISR matrix elements whose cell pairs have the same PCI mod 3, same PCI mod 6, same PCI mod 30. In addition, for any non-zero element of the ISR matrix, this element must not have its cells have the same PCI. This procedure is similar to the one proposed in "Problem Formulation for Efficient Search of Optimized LTE Physical Cell IDs", but unlike that of "Problem Formulation for Efficient Search of Optimized LTE Physical Cell IDs", this procedure considers, e.g., same PCI mod 6 avoidance when needed, treats the neighbor cell PCIs as static variables, and considers only the signal strengths from neighbourhood cells. The "Problem Formulation for Efficient Search of Optimized LTE Physical Cell IDs" was an original title for a disclosure subsequently filed as a P.C.T. application number PCT/EP2012/074346, filed Dec. 4, 2012, entitled "Algorithm for Physical Cell Identifier Allocation".

It is noted that if the X2 neighbour lists are not received from the neighbour cells, the following is used:

$$\Gamma^{neighbourhood}(t) = [\Gamma^{target}(t)] \quad (3')$$

In step 10, the eNB 180 solves for the PCIs of the target eNB for the serving cells of the eNB only using the neighbourhood ISR matrix, and all the X2-neighbour lists. There are various methods of solving for the PCIs from the measurements and X2-neighbour list data, and these are not covered in this document. Only the general optimization problem is outlined here, to arrive at the optimal solution.

Let there be Z number of candidate solutions for the PCI value allocation of all cells in the target eNB. Let $p_z$ represent the z'th (z=1, 2, 3, ..., Z) candidate PCI solution, containing the combined vector of candidate PCIs of the optimization target cell and surrounding cells, under the same ordering of $\Gamma^{neighbourhood}$. $p_{z,i}$ represents the i'th element of $p_z$, corresponding to the i'th cell. The assignment for each element of $p_z$ is under the condition that $$p_{z,i} \leq 503 \forall i \quad (4)$$

Blacklisted PCI values may also be enforced.

In the succeeding set of paragraphs, we outline the mathematical formulation to obtain the optimized PCIs. First, cells with the same PCI mod 3 are grouped together through the grouping matrix $G_z^{mod3}$ whose element at row i, column j is given by:

$$G_{z,i,j}^{mod3} = \begin{cases} 1 & j = (p_{z,i} \bmod 3) + 1 \\ 0 & \text{otherwise} \end{cases}, \quad (5)$$

where $G_z^{mod3}$ has $N_{cells}^{target} + N_{cells}^{surrounding}$ rows and three columns. Simply put, for the candidate solution $G_z^{mod3}$, column j has a value of 1 for row i if the candidate PCI of cell i has a modulo of j−1. This matrix "groups" the cells which have the PCI mod 3 by forcing them to be equal to 1 on the same column and zero on other columns.

An optimized PCI $p_{opt}$ that minimizes same PCI mod 3 collisions is determined from the solution of the following optimization problem:

$$\min_z \text{Trace}((G_z^{mod3})^T \Gamma^{neighbourhood} G_z^{mod3}), \quad (6)$$

where Trace (A) is the trace operation, which for an n-by-n square matrix A is defined to be the sum of the elements on the main diagonal (the diagonal from the upper left to the lower right) of A. That is, since there is a one-is-to-one mapping between $p_z$ and $G_z^{mod3}$, $p_{opt}$ is determined by the $G_z^{mod3}$ that makes Equation (6) true (e.g., the $G_z^{mod3}$ that minimizes Trace( ) over z). The matrix product $(G_z^{mod3})^T \Gamma^{neighbourhood} G_z^{mod3}$ performs a sifting operation, whereby the i'th element in its diagonal (i.e., row number is the same as the column number) is the sum of all the elements $\Gamma_{i,j}^{neighbourhood}$ for which cell i and cell j belong to the same PCI mod 3 group.

Trace( ) is used to sum all the elements of $\Gamma^{neighbourhood}$ and $G_z^{mod3}$. In other words, Trace( ) collects the sum of the diagonal elements of $(G_z^{mod3})^T \Gamma^{neighbourhood} G_z^{mod3}$ to give the total penalty of candidate solution z, in terms of ISR.

Cells with the same PCI mod 6 are grouped together through the grouping matrix $G_z^{mod6}$ whose element at row i column j is given by:

$$G_{z,i,j}^{mod6} = \begin{cases} 1 & j = (p_{z,i} \bmod 6) + 1 \\ 0 & \text{otherwise} \end{cases}, \quad (7)$$

where $G_z^{mod6}$ has $N_{cells}^{target} + N_{cells}^{surrounding}$ rows and six columns.

An optimized PCI $p_{opt}$ that minimizes same PCI mod 6 collisions is determined from the solution of the following optimization problem:

$$\min_z \text{Trace}((G_z^{mod6})^T \Gamma^{neighbourhood} G_z^{mod6}) \quad (8)$$

That is, $p_{opt}$ is determined by the $G_z^{mod6}$ that makes Equation (8) true (e.g., the $G_z^{mod6}$ that minimizes Trace( ) over z).

Cells with the same PCI mod 30 are grouped together through the grouping matrix $G_z^{mod30}$ whose element at row i column j is given by:

$$G_{z,i,j}^{mod30} = \begin{cases} 1 & j = (p_{z,i} \bmod 30) + 1 \\ 0 & \text{otherwise} \end{cases}, \quad (9)$$

where $G_z^{mod30}$ has $N_{cells}^{target} + N_{cells}^{surrounding}$ rows and thirty columns.

An optimized PCI $p_{opt}$ that minimizes same PCI mod 30 collisions is determined from the solution of the following optimization problem:

$$\min_z \text{Trace}((G_z^{mod30})^T \Gamma^{neighbourhood} G_z^{mod30}). \quad (10)$$

That is, $p_{opt}$ is determined by the $G_z^{mod30}$ that makes Equation (10) true (e.g., the $G_z^{mod30}$ that minimizes Trace( ) over z).

For the z'th candidate PCI solution, cells with the same PCI are grouped together through the grouping matrix $G_z^{PCI}$ whose element at row i column j is given by:

$$G_{z,i,j}^{PCI} = \begin{cases} 1 & j = p_{z,i} + 1 \\ 0 & \text{otherwise} \end{cases}. \quad (11)$$

$G_z^{PCI}$ has $N_{cells}^{target} + N_{cells}^{surrounding}$ rows and 504 columns.

Same-PCI collisions and confusions should be avoided with measured neighbors as contained in $\Gamma^{neighbourhood}$, as well as defined X2-neighbours and X2-neighbour-of-neighbours. So, from the collected X2 neighbor lists, define the optimization target eNB's X2-neighbour adjacency matrix, Z where the columns and rows of Z correspond to those of $\Gamma^{neighbourhood}$. The ij'th element of Z is given by, $$Z_{i,j} = \quad (12)$$

$$\begin{cases} 1 & \text{cell } i \text{ and } j \text{ are } X2 \text{ neighbours or } X2 \text{ neighbour-of-neighbours} \\ 0 & \text{otherwise} \end{cases}.$$

An optimized PCI $p_{opt}$ that avoids same-PCI collisions and confusion is determined from the solution of the following problem:

$$\text{Trace}((G_z^{PCI})^T (\Gamma^{neighbourhood} + Z) G_z^{PCI}) = 0. \quad (13)$$

That is, $p_{opt}$ is determined by the $G_z^{PCI}$ that makes Equation (13) true.

Figure 6:
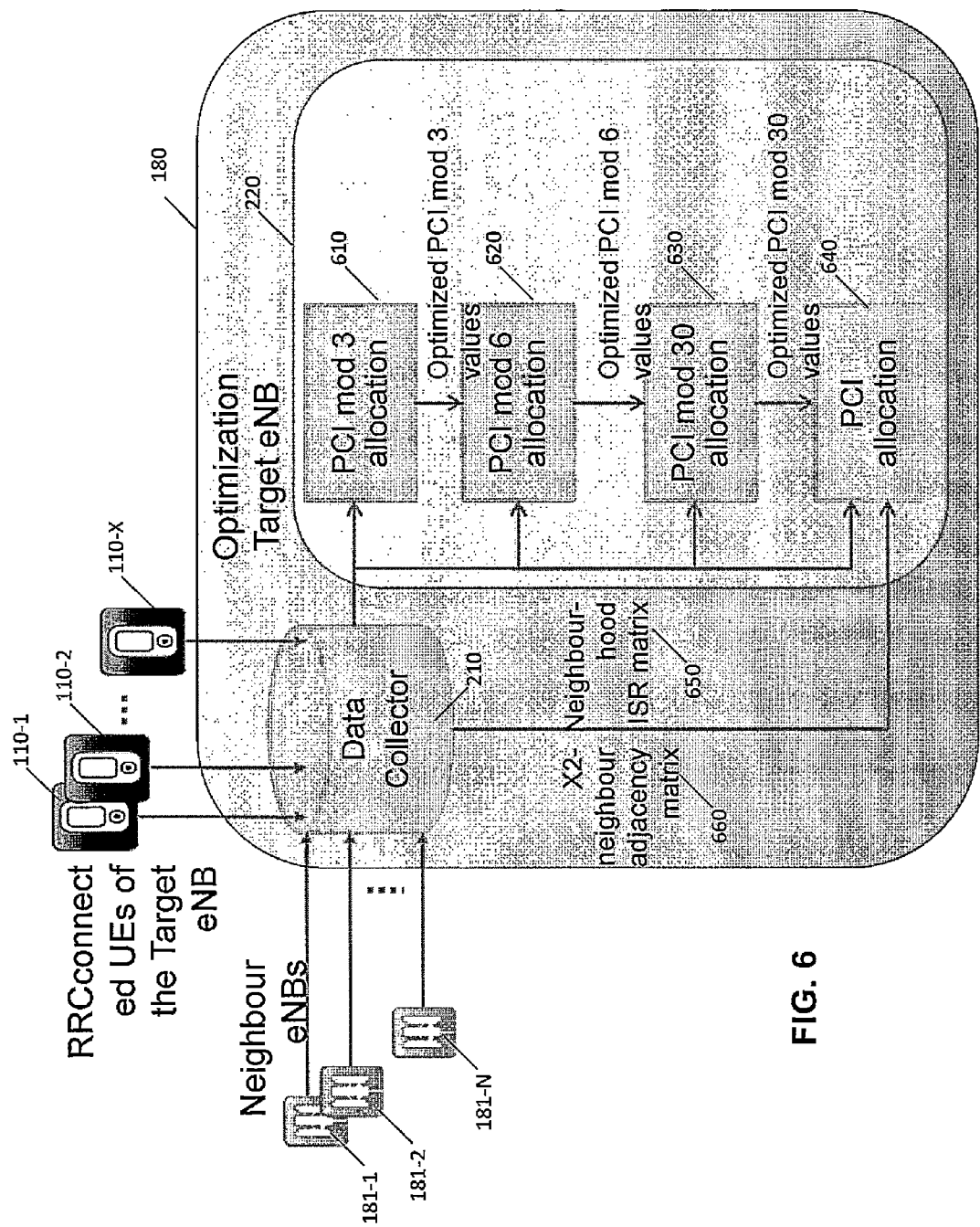
FIG. 6 is a block diagram of an exemplary configuration of a target eNB connected to UEs and neighbor eNBs for self-organized distributed optimization of physical cell IDs and for illustrating PCI solution constraints.

It is noted that solutions above are in general not independent. Refer to FIG. 6, which is a block diagram of an exemplary configuration of a target eNB connected to UEs and neighbor eNBs for self-organized distributed optimization of physical cell IDs and for illustrating PCI solution constraints. The general PCI solution (e.g., from Equation (13) and illustrated as PCI allocation 640 in FIG. 6) may be constrained by the PCI mod 30 solution (e.g., from Equation (10) and illustrated as PCI mod 30 allocation 630 in FIG. 6). The PCI mod 30 solution, which is to avoid uplink DMRS interference, may be constrained by the PCI mod 6 solution (e.g., from Equation (8) and illustrated as PCI mod 6 allocation 620 in FIG. 6) and/or the PCI mod 3 solution (e.g., from Equation (6) and illustrated as PCI mode 3 allocation 610 in FIG. 6). The PCI mod 6 solution is to avoid downlink CRS collision under single Tx mode. Furthermore, the PCI mod 6 solution may be constrained by the PCI mod 3 solution. The PCI mod 3 solution is to avoid downlink CRS collision under MIMO Tx mode and to avoid collision of primary synchronization signals. Each of these PCI allocations acts as a precondition to reduce a search space for the following PCI allocation. For instance, the PCI mod 3 allocation 610 acts as a precondition to reduce a search space for the PCI mod 6 allocation 620, the PCI mod 6 allocation 620 (or PIC mod 3 allocation 610) acts as a precondition to reduce a search space for the PCI mod 30 allocation 630, the PCI mod 30 allocation 610 acts as a precondition to reduce a search space for the general PCI solution, the PCI allocation 640, The neighbourhood ISR matrix 650, $I^{neighbourhood}(t)$, is also illustrated in FIG. 6, as is the X2 neighbor adjacency matrix 660.

In step 11, the eNB 180 applies the optimized PCIs to its own cells 330. Applying the optimized PCIs may be automated, or may require a user prompt to proceed.

In step 12, the eNB 180, if the PCI value of any of its cells changes, reports new PCIs to all neighbor eNBs 181.

In step 13, the eNB 180 informs the neighbor eNBs that the eNB 180 has finished its PCI allocation phase. This step is optional.

In step 14, the eNB 180 restarts the procedure from step 1 (in FIG. 4). Restarting the procedure is one possibility. The algorithm is restarted from step 1 (configure measurement reporting), in an exemplary embodiment, to ensure that the PCI allocation evolves with continuously changing the traffic conditions or neighbor cell presence. This step can be optional if a static allocation (as opposed to a semi-static allocation) is preferred. In general, however, one wants the option of having semi-static PCI allocations, especially for scenarios in which neighbor cells are nomadically added or removed (e.g., femto cells; small cells with traffic-based power saving).

It is further noted that matrix-based mathematical notation (e.g., Trace(A)) is used above in the calculations to simplify the elaboration of the equations, which is common practice in working with optimization problems. As is known, one can forego the use of matrix notation and operations to perform the same mathematical operations. Thus, using matrix-based mathematics is only one way to perform the operations herein.

Exemplary advantages include one or more of the following non-limiting examples, which also may be examples of technical effects of the embodiments. The exemplary embodiments herein have several advantages over conventional systems. First, since the optimization is distributed, the optimization does not require a centralized unit, allowing for less complexity and cost. Second, an eNB 180 only optimizes the PCIs of its own cells, and so the search space to optimize the PCI of an eNB is very small. The search space to optimize an entire network is also reduced. For example, for a network with 3-sector sites, the size of the total search space to optimize the PCI mod 3s of the entire network under the centralized approach is $6^{N_{site}-1}$, while with the distributed approach, it becomes only $6(N_{site}-1)$. Hence, there is no need to implement a powerful search algorithm. Third, to optimize the PCIs of an eNB 180, that eNB requires only the neighbor list and post-processed measurement data of its neighbor eNBs 181. Consequently, a new eNB or re-positioned eNB can be optimized individually and automatically. The eNB can automatically correct PCI assignments which produce same-PCI collisions and confusions. This helps the network to be "plug-and-play," which means that the huge burden of manual or periodic planning or optimization is not necessary. Fourth, since each eNB 180 can be optimized without the need to optimize other eNBs, there is no need to simultaneously block-off all the eNBs to be optimized. The temporary outage can be localized, thereby not severely impacting the network performance. Finally, the proposed methods may also consider the PCI mod 6 to better avoid CRS collisions for single Tx-antenna cells and V-H polarized two-Tx-antenna cells, which the earlier methods did not.

An exemplary advantage of a centralized optimization approach over a distributed approach as herein is that the centralized optimization approach can potentially arrive at fewer CRS/PSS/DMRS collisions for the entire network, since the centralized optimization approach has a larger search space to try to find the globally optimum allocation. However, the distributed approach herein can still provide substantial gains in removing CRS/PSS/DMRS collisions over a non-optimized network, and same PCI collisions and confusions are still guaranteed to be avoided.

It is foreseen that LTE capacity is required to increase several hundred-fold over the next decade. To meet this requirement, many LTE networks would be densely deployed and heterogeneous, which means that a network would be composed of large-sized cells (i.e., macro-cells), smaller cells (i.e., micro-cells), and even very small cells (pico-cells or femto-cells). The pico-cells and femto-cells are typically deployed quickly and often at non-ideal locations. They may also be re-positioned quite often by the location owners, without knowledge of the operator. The conventional centralized PCI optimization approach would be unsuitable for this heterogeneous network use case, for the reasons stated above. However, for this use case, the proposed self-organized PCI optimization method is desirable because of its simplicity, agility, and robustness. Because of the automated self-optimization, the distributed techniques will eliminate the huge effort of LTE PCI planning and optimization to the operator, allowing for greater speed and flexibility to LTE deployments, while providing optimized LTE performance. Through the exemplary embodiments herein, LTE PCI management, which has been considered to be quite tedious, would be a much easier endeavor. In addition, the exemplary distributed techniques herein could be a key component for Distributed Self-Organizing Network (SON) features.

Figure 7:
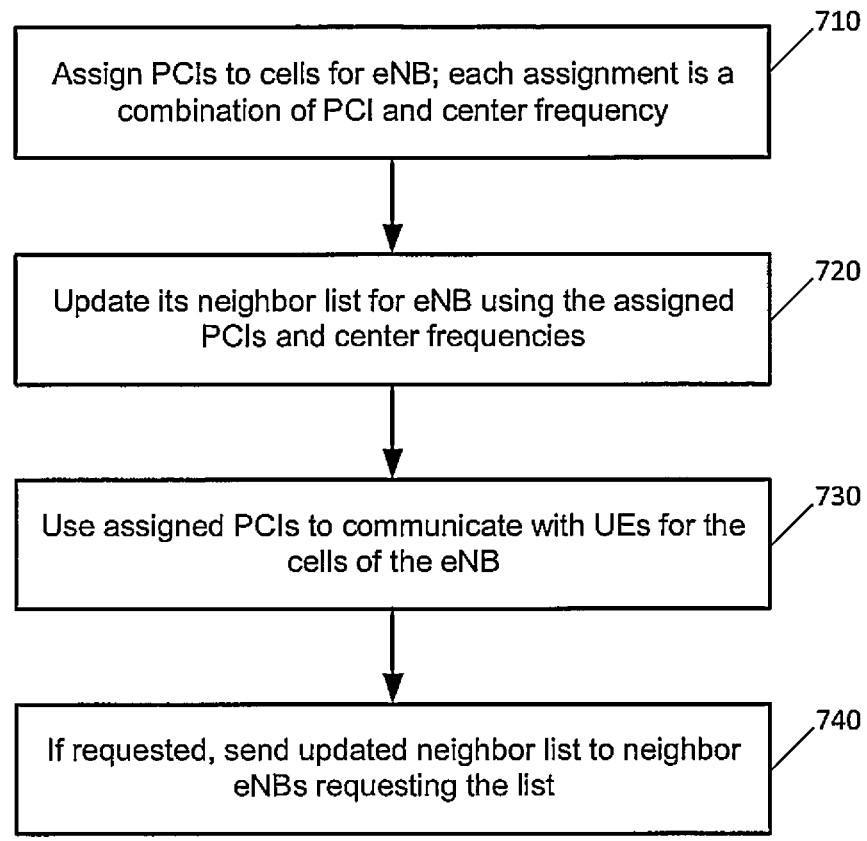
FIG. 7 is a logic flow diagram for using physical cell IDs, and illustrates the operation of an exemplary method, a result of execution of computer program instructions embodied on a computer readable memory, functions performed by logic implemented in hardware, and/or interconnected means for performing functions in accordance with an exemplary embodiment.

Once the PCIs have been assigned by the eNB 180, e.g., in step 11 of FIG. 5B, to its cells, the eNB 180 is free to use the assigned PCIs. One example of the use of physical cell IDs is illustrated by FIG. 7. FIG. 7 illustrates the operation of an exemplary method, a result of execution of computer program instructions embodied on a computer readable memory, functions performed by logic implemented in hardware, and/or interconnected means for performing functions in accordance with an exemplary embodiment. The blocks in FIG. 7 are assumed to be performed by an eNB 180. In block 710, the eNB 180 assigns PCIs to cells for the eNB. Each assignment is a combination of PCI and center frequency. In block 720, the eNB 180 updates its neighbor list for the eNB using the assigned PCIs and center frequencies. In block 730, the eNB 180 uses the assigned PCIs to communicate with UEs for the cells of the eNB. In block 740, the eNB 180, if requested, sends the updated neighbor list to neighbor eNBs requesting the list. An apparatus may comprise means for performing any or all of the blocks in FIG. 7.

Figure 8:
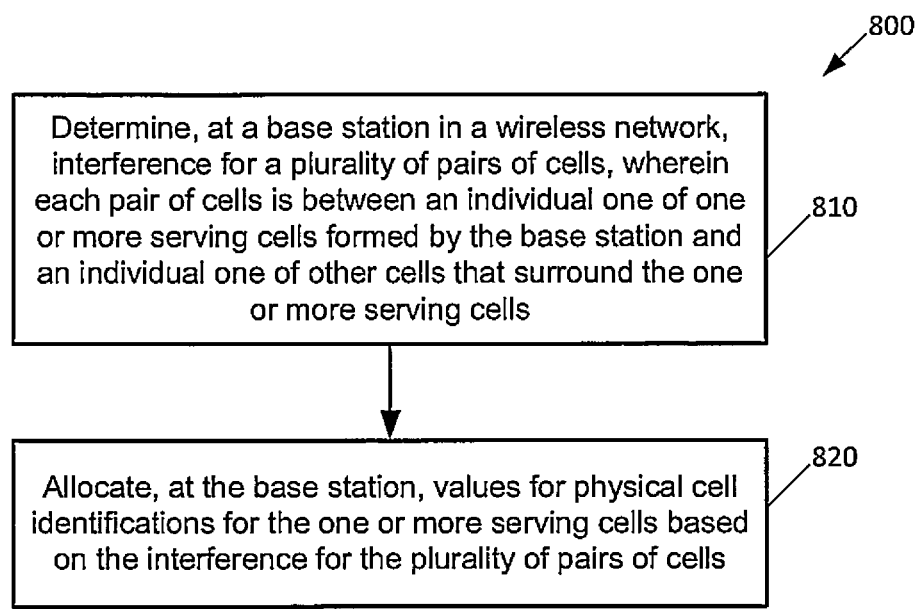
FIG. 8 is a logic flow diagram for self-organized distributed assignment of physical cell IDs, and illustrates the operation of an exemplary method, a result of execution of computer program instructions embodied on a computer readable memory, functions performed by logic implemented in hardware, and/or interconnected means for performing functions in accordance with an exemplary embodiment.

Referring to FIG. 8, this figure is a logic flow diagram for self-organized distributed assignment of physical cell IDs. This figure also illustrates the operation of an exemplary method 800, a result of execution of computer program instructions embodied on a computer readable memory, functions performed by logic implemented in hardware, and/or interconnected means for performing functions in accordance with an exemplary embodiment. The blocks in FIG. 8 are assumed to be performed by the eNB 180.

In block 810, the eNB determines interference for a plurality of pairs of cells. Each pair of cells is between an individual one of one or more serving cells formed by the base station and an individual one of other cells that surround the one or more serving cells. This is described above, e.g., in reference to Equations (3) and (3'). In block 820, the eNB 180 allocates values for physical cell identifications for the one or more serving cells based on the interference for the plurality of pairs of cells. Allocation of PCIs is described above, for instance in reference to Equation (4) and further in reference, in additional embodiments, to Equations (5) to (13). Method 700 is also referred to as Example 1 herein.

Additional examples are as follows. Example 2. The method of method 700, wherein: the plurality of pairs of cells is a first plurality of pairs of cells; the determining the interference for the plurality of pairs of cells determines a first matrix; the method further comprises receiving second matrices from neighbor cells neighboring the one or more serving cells, each of the second matrices having interference for a second plurality of pairs of cells, wherein each second pair of cells is between an individual one of the neighbor cells and an individual one of other cells that surround the individual one of the neighbor cells; and allocating, at the base station, values for physical cell identifications for the one or more serving cells is based on the first matrix and the second matrices.

Example 3

The method 700 or the method of Example 2, wherein allocating values for physical cell identifications for the one or more serving cells further comprises the solving the following problem: Trace $((G_z^{PCI})^T(\Gamma^{neighbourhood}+Z)G_z^{PCI})=0$ where Trace( ) is a trace operation, $\Gamma^{neighbourhood}$ is a matrix of interference consisting of $\Gamma^{target}(t)$, which is a first matrix for only the first plurality of pairs of cells, when only the first plurality of pairs of cells is used, and comprising $\Gamma^{target}(t)$ and a plurality of $\Gamma^{partial}(t)$, each of which is a second matrix, when both the first matrix and the second matrices are used, $$Z_{i,j} = \begin{cases} 1 & \text{cell } i \text{ and } j \text{ are neighbours or neighbour-of-neighbours} \\ 0 & \text{otherwise} \end{cases},$$

$G_z^{PCI}$ is a grouping matrix whose element at row i column j is given by $$G_{z,i,j}^{PCI} = \begin{cases} 1 & j = p_{z,i} + 1 \\ 0 & \text{otherwise} \end{cases},$$

where $p_z$ represent a z'th candidate solution for the physical cell identifications, and the values for the physical cell identifications for the one or more serving cells are $p_{opt}$, which is determined by the $G_z^{PCI}$ that makes the equation in the problem true.

Example 4

The method 700 or the method of Example 2, wherein the allocating, at the base station, values for physical cell identifications for the one or more serving cells determines final values and comprises: allocating, at the base station, first values for physical cell identifications for the one or more serving cells based on minimizing same physical cell identification modulo 30 collisions; and performing, at the base station, a general allocating of the first values for physical cell identifications for the one or more serving cells constrained by the allocated first values in order to determine the final values.

Example 5

The method of Example 4, wherein the allocating, at the base station, values for physical cell identifications for the one or more serving cells comprises: allocating, at the base station, second values for physical cell identifications for the one or more serving cells based on minimizing same physical cell identification modulo 6 collisions; allocating, at the base station and constrained by the allocated second values, the first values for physical cell identifications for the one or more serving cells based on minimizing same physical cell identification modulo 30 collisions.

Example 6

The method of Example 5, wherein the allocating, at the base station, values for physical cell identifications for the one or more serving cells comprises: allocating, at the base station, third values for physical cell identifications for the one or more serving cells based on minimizing same physical cell identification modulo 3 collisions; allocating, at the base station and constrained by the allocated third values, the second values for physical cell identifications for the one or more serving cells based on minimizing same physical cell identification modulo 6 collisions.

Example 7

The method 700 or any of the methods of Examples 2 to 6, wherein determining, at a base station in a wireless network, interference for a plurality of pairs of cells further comprises: collecting, at the base station, measurement report data from a plurality of user equipment in one or more serving cells, wherein the measurement report data comprise measurements of signal strength of measured cells relative to the user equipment and corresponding identities of the measured cells, and wherein the measured cells comprise the one or more serving cells and the other cells; mapping the signal strengths to the plurality of pairs of cells; and determining the interference for the plurality of pairs of cells based on the mapped signal strengths.

Example 8

The method of Example 7, wherein the interference for the plurality of pairs of cells is a first matrix $\Gamma^{target}$ of interference values, wherein at a current period t, the i'th serving cell and its j'th other cell in a pair has $K_{i,j}(t)$ interference values, and $\Gamma_{i,j}^{target}(t)=\Gamma_{i,j}^{new}(t)$, where $\Gamma_{i,j}^{new}(t)$ is for a current period, $$\Gamma_{i,j}^{new}(t) = \begin{cases} \left(\sum_{k=1}^{K_{i,j}(t)} \frac{R_{i,j,k}^{other}(t)}{R_{i,j,k}^{server}(t)}\right) & i \neq j; R_{i,j,k}^{server}(t) > 0 \\ 0 & i \neq j; R_{i,j,k}^{server}(t) = 0 \\ 0 & i = j \end{cases},$$

where a k'th server measurement of a pair for the current period t is denoted by $R_{i,j,k}^{server}(t)$ and a k'th other cell measurement of the pair for the current period t is denoted by $R_{i,j,k}^{other}(t)$.

Example 9

The method 700 or any of the methods of Examples 2 to 8, wherein the other cells comprise one or more of the following: neighbor cells, neighbor-of-neighbor cells, or other cells which have measurements but are not yet designated as neighbors or are not yet designated as neighbor-of-neighbors.

Another exemplary embodiment is an apparatus comprising means for performing method 700 or any of the Examples 2 to 9. Another example is an apparatus comprising one or more processors; and one or more memories including computer program code. The one or more memories and the computer program code are configured, with the one or more processors, to cause the apparatus to perform method 700 or any of the Examples 2 to 9.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

Abbreviations that may be found in the specification and/or the drawing figures are defined below.

3GPP third generation partnership project
BLER BLock Error Rate
CGI Cell Global ID
CRS Cell-specific Reference Signal
CQI Channel Quality Indicator
DMRS DeModulation Reference Signal
eNB or eNodeB base station (e.g., for LTE), evolved Node B
ID IDentification
IIR Infinite Impulse Response
ISR Interference-to-Signal Ratio
KPI Key Performance Indicator
LTE Long Term Evolution
mod modulo, the modulo operation finds a remainder of division of one number by another
MME Mobility Management Entity
MR Measurement Report
NCE Network Control Element
PCI Physical layer Cell ID
PDSCH Physical Downlink Shared CHannel
PSS Physical Synchronization Signal
PUCCH Physical Uplink Control CHannel
RAN Radio Access Network
RACH Random Access CHannel
Rel release
RSRP Reference Signal Received Power
RSRQ Reference Signal Received Quality
RRM Radio Resource Management
Rx receiver or reception
SGW Serving GateWay
TS technical specification
Tx transmitter or transmission
UE User Equipment
V-H Vertical-Horizontal

What is claimed is:

1. A method, comprising:
determining, at a base station in a wireless network, interference for a plurality of pairs of cells, wherein each pair of cells is between an individual one of one or more serving cells formed by the base station and an individual one of other cells that surround the one or more serving cells; and
allocating, at the base station, values for physical cell identifications for the one or more serving cells based on the interference for the plurality of pairs of cells;
wherein allocating values for physical cell identifications for the one or more serving cells further comprises solving the following problem:

$$\text{Trace}((G_z^{PCI})^T(\Gamma^{neighbourhood}+Z)G_z^{PCI})=0,$$

where Trace( ) is a trace operation, $\Gamma^{neighbourhood}$ is a matrix of interference consisting of $\Gamma^{target}(t)$, which is a first matrix for only a first plurality of pairs of cells, when only the first plurality of pairs of cells is used, and comprising $\Gamma^{target}(t)$ and a plurality of $\Gamma^{partial}(t)$, each of which is a second matrix, when both the first matrix and the second matrices are used, $$Z_{i,j} = \begin{cases} 1 & \text{cell } i \text{ and } j \text{ are neighbours or neighbour-of-neighbours} \\ 0 & \text{otherwise} \end{cases},$$

$G_z^{PCI}$ is a grouping matrix whose element at row i column j is given by $$G_{z,i,j}^{PCI} = \begin{cases} 1 & j = p_{z,i}+1 \\ 0 & \text{otherwise} \end{cases},$$

where $p_z$ represent a z'th candidate solution for the physical cell identifications, and the values for the physical cell identifications for the one or more serving cells are $p_{opt}$, which is determined by the $G_z^{PCI}$ that makes the equation in the problem true.

2. The method of claim 1, wherein:
the plurality of pairs of cells is the first plurality of pairs of cells;
the determining the interference for the plurality of pairs of cells determines the first matrix;
the method further comprises receiving the second matrices from neighbor cells neighboring the one or more serving cells, each of the second matrices having interference for a second plurality of pairs of cells, wherein each second pair of cells is between an individual one of the neighbor cells and an individual one of other cells that surround the individual one of the neighbor cells; and
allocating, at the base station, values for physical cell identifications for the one or more serving cells is based on the first matrix and the second matrices.

3. The method of claim 1, wherein the allocating, at the base station, values for physical cell identifications for the one or more serving cells determines final values and comprises:
allocating, at the base station, first values for physical cell identifications for the one or more serving cells based on minimizing same physical cell identification modulo 30 collisions; and
performing, at the base station, a general allocating of the first values for physical cell identifications for the one or more serving cells constrained by the allocated first values in order to determine the final values.

4. The method of claim 3, wherein the allocating, at the base station, values for physical cell identifications for the one or more serving cells comprises:
allocating, at the base station, second values for physical cell identifications for the one or more serving cells based on minimizing same physical cell identification modulo 6 collisions;
allocating, at the base station and constrained by the allocated second values, the first values for physical cell identifications for the one or more serving cells based on minimizing same physical cell identification modulo 30 collisions.

5. The method of claim 4, wherein the allocating, at the base station, values for physical cell identifications for the one or more serving cells comprises:
allocating, at the base station, third values for physical cell identifications for the one or more serving cells based on minimizing same physical cell identification modulo 3 collisions;
allocating, at the base station and constrained by the allocated third values, the second values for physical cell identifications for the one or more serving cells based on minimizing same physical cell identification modulo 6 collisions.

6. The method of claim 1, wherein determining, at a base station in a wireless network, interference for a plurality of pairs of cells further comprises:
collecting, at the base station, measurement report data from a plurality of user equipment in one or more serving cells, wherein the measurement report data comprise measurements of signal strength of measured cells relative to the user equipment and corresponding identities of the measured cells, and wherein the measured cells comprise the one or more serving cells and the other cells;
mapping the signal strengths to the plurality of pairs of cells; and
determining the interference for the plurality of pairs of cells based on the mapped signal strengths.

7. The method of claim 6, wherein the interference for the plurality of pairs of cells is the first matrix $\Gamma^{target}$ of interference values, wherein at a current period t, the i'th serving cell and its j'th other cell in a pair has $K_{i,j}(t)$ interference values, and $\Gamma_{i,j}^{target}(t) = \Gamma_{i,j}^{new}(t)$, where $\Gamma_{i,j}^{new}(t)$ is for a current period, $$\Gamma_{i,j}^{new}(t) = \begin{cases} \left( \sum_{k=1}^{K_{i,j}} \frac{R_{i,j,k}^{other}(t)}{R_{i,j,k}^{server}(t)} \right) & i \neq j; R_{i,j,k}^{server}(t) > 0 \\ 0 & i \neq j; R_{i,j,k}^{server}(t) = 0 \\ 0 & i = j \end{cases},$$

where a k'th server measurement of a pair for the current period t is denoted by $R_{i,j,k}^{server}(t)$ and a k'th other cell measurement of the pair for the current period t is denoted by $R_{i,j,k}^{other}(t)$.

8. The method of claim 1, wherein the other cells comprise one or more of the following: neighbor cells, neighbor-of-neighbor cells, or other cells which have measurements but are not yet designated as neighbors or are not yet designated as neighbor-of-neighbors.

9. An apparatus, comprising:
one or more processors; and
one or more memories including computer program code,
the one or more memories and the computer program code configured, with the one or more processors, to cause the apparatus to perform at least the following:
determining, at a base station in a wireless network, interference for a plurality of pairs of cells, wherein each pair of cells is between an individual one of one or more serving cells formed by the base station and an individual one of other cells that surround the one or more serving cells; and
allocating, at the base station, values for physical cell identifications for the one or more serving cells based on the interference for the plurality of pairs of cells;
wherein the allocating values for physical cell identifications for the one or more serving cells further comprises solving the following problem:

Trace$((G_z^{PCI})^T(\Gamma^{neighbourhood}+Z)G_z^{PCI})=0$, where Trace( ) is a trace operation, $\Gamma^{neighbourhood}$ is a matrix of interference consisting of $\Gamma^{target}(t)$, which is a first matrix for only a first plurality of pairs of cells, when only the first plurality of pairs of cells is used, and comprising $\Gamma^{target}(t)$ and a plurality of $\Gamma^{partial}(t)$, each of which is a second matrix, when both the first matrix and the second matrices are used, $$Z_{i,j} = \begin{cases} 1 & \text{cell } i \text{ and } j \text{ are neighbours or neighbour-of-neighbours} \\ 0 & \text{otherwise} \end{cases},$$

$G_z^{PCI}$ is a grouping matrix whose element at row i column j is given by $$G_{z,i,j}^{PCI} = \begin{cases} 1 & j = p_{z,i}+1 \\ 0 & \text{otherwise} \end{cases},$$

where $p_z$ represent a z'th candidate solution for the physical cell identifications, and the values for the physical cell identifications for the one or more serving cells are $p_{opt}$, which is determined by the $G_z^{PCI}$ that makes the equation in the problem true.

10. The apparatus of claim 9, wherein:
the plurality of pairs of cells is the first plurality of pairs of cells;
the determining the interference for the plurality of pairs of cells determines the first matrix;
the one or more memories and the computer program code are further configured, with the one or more processors, to cause the apparatus to perform at least the following: receiving the second matrices from neighbor cells neighboring the one or more serving cells, each of the second matrices having interference for a second plurality of pairs of cells, wherein each second pair of cells is between an individual one of the neighbor cells and an individual one of other cells that surround the individual one of the neighbor cells; and
the allocating, at the base station, values for physical cell identifications for the one or more serving cells is based on the first matrix and the second matrices.

11. The apparatus of claim 9, wherein the allocating, at the base station, values for physical cell identifications for the one or more serving cells determines final values and further comprises:
allocating, at the base station, first values for physical cell identifications for the one or more serving cells based on minimizing same physical cell identification modulo 30 collisions; and
performing, at the base station, a general allocating of the first values for physical cell identifications for the one or more serving cells constrained by the allocated first values in order to determine the final values.

12. The apparatus of claim 11, wherein the allocating, at the base station, values for physical cell identifications for the one or more serving cells comprises:
allocating, at the base station, second values for physical cell identifications for the one or more serving cells based on minimizing same physical cell identification modulo 6 collisions; and
allocating, at the base station and constrained by the allocated second values, the first values for physical cell identifications for the one or more serving cells based on minimizing same physical cell identification modulo 30 collisions.

13. The apparatus of claim 12, wherein the allocating, at the base station, values for physical cell identifications for the one or more serving cells comprises:
allocating, at the base station, third values for physical cell identifications for the one or more serving cells based on minimizing same physical cell identification modulo 3 collisions; and
allocating, at the base station and constrained by the allocated third values, the second values for physical cell identifications for the one or more serving cells based on minimizing same physical cell identification modulo 6 collisions.

14. The apparatus of claim 9, wherein the determining, at a base station in a wireless network, interference for a plurality of pairs of cells further comprises:
collecting, at the base station, measurement report data from a plurality of user equipment in one or more serving cells, wherein the measurement report data comprise measurements of signal strength of measured cells relative to the user equipment and corresponding identities of the measured cells, and wherein the measured cells comprise the one or more serving cells and the other cells;
mapping the signal strengths to the plurality of pairs of cells; and
determining the interference for the plurality of pairs of cells based on the mapped signal strengths.

15. The apparatus of claim 14, wherein the interference for the plurality of pairs of cells is the first matrix $\Gamma^{target}$ of interference values, wherein at a current period t, the i'th serving cell and its j'th other cell in a pair has $K_{i,j}(t)$ interference values, and $\Gamma_{i,j}^{target}(t) = \Gamma_{i,j}^{new}(t)$, where $\Gamma_{i,j}^{new}(t)$ is for a current period, $$\Gamma_{i,j}^{new}(t) = \begin{cases} \left( \sum_{k=1}^{K_{i,j}(i)} \frac{R_{i,j,k}^{other}(t)}{R_{i,j,k}^{server}(t)} \right) & i \neq j; R_{i,j,k}^{server}(t) > 0 \\ 0 & i \neq j; R_{i,j,k}^{server}(t) = 0 \\ 0 & i = j \end{cases},$$

where a k'th server measurement of a pair for the current period t is denoted by $R_{i,j,k}^{server}(t)$ and a k'th other cell measurement of the pair for the current period t is denoted by $R_{i,j,k}^{other}(t)$.

16. The apparatus of claim 9, wherein the other cells comprise one or more of the following: neighbor cells, neighbor-of-neighbor cells, or other cells which have measurements but are not yet designated as neighbors or are not yet designated as neighbor-of-neighbors.

17. The apparatus of claim 9, formed as part of a base station.

18. A non-transitory computer-readable storage medium comprising a computer program product having computer program code embodied therein for use with a computer, the computer program code comprising:
determining, at a base station in a wireless network, interference for a plurality of pairs of cells, wherein each pair of cells is between an individual one of one or more serving cells formed by the base station and an individual one of other cells that surround the one or more serving cells; and
allocating, at the base station, values for physical cell identifications for the one or more serving cells based on the interference for the plurality of pairs of cells;
wherein the allocating values for physical cell identifications for the one or more serving cells further comprises solving the following problem:

Trace$((G_z^{PCI})^T(\Gamma^{neighbourhood}+Z)G_z^{PCI})=0$, where Trace( ) is a trace operation, $\Gamma^{neighbourhood}$ is a matrix of interference consisting of $\Gamma^{target}(t)$, which is a first matrix for only a first plurality of pairs of cells, when only the first plurality of pairs of cells is used, and comprising $\Gamma^{target}(t)$ and a plurality of $\Gamma^{partial}(t)$, each of which is a second matrix, when both the first matrix and the second matrices are used, $$Z_{i,j} = \begin{cases} 1 & \text{cell } i \text{ and } j \text{ are neighbours or neighbour-of-neighbours} \\ 0 & \text{otherwise} \end{cases},$$

$G_z^{PCI}$ is a grouping matrix whose element at row i column j is given by $$G_{z,i,j}^{PCI} = \begin{cases} 1 & j = p_{z,i} + 1 \\ 0 & \text{otherwise} \end{cases},$$  (5)

where $p_z$ represent a z'th candidate solution for the physical cell identifications, and the values for the physical cell identifications for the one or more serving cells are $p_{opt}$, which is determined by the $G_z^{PCI}$ that makes the equation in the problem true.

* * * * *